Oct. 11, 1932.  B. G. GOBLE  1,882,492
OIL BATH BEARING WITH A ROOF
Filed Aug. 7, 1929  3 Sheets-Sheet 2
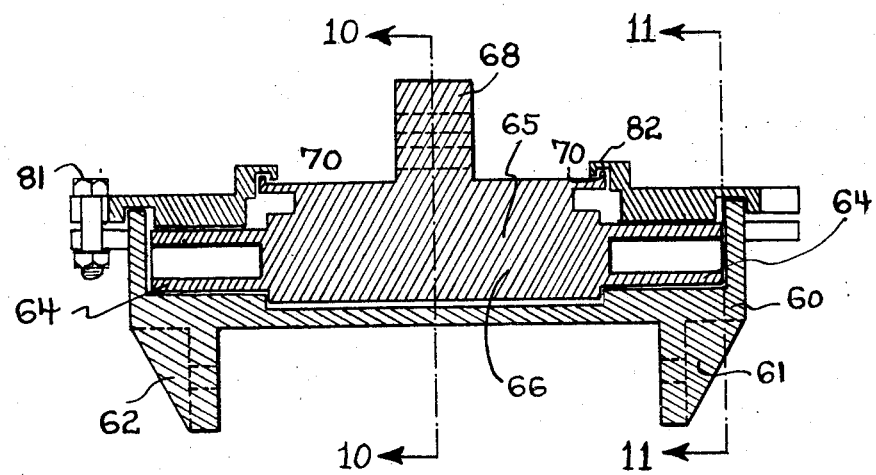
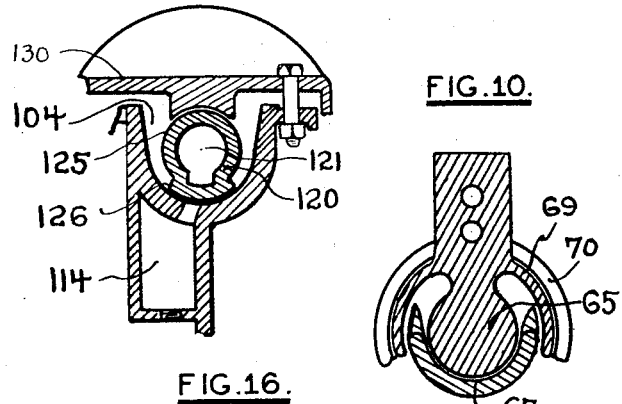
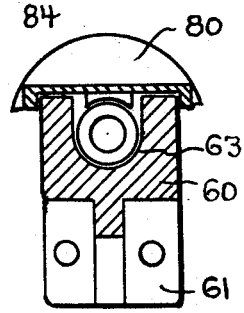
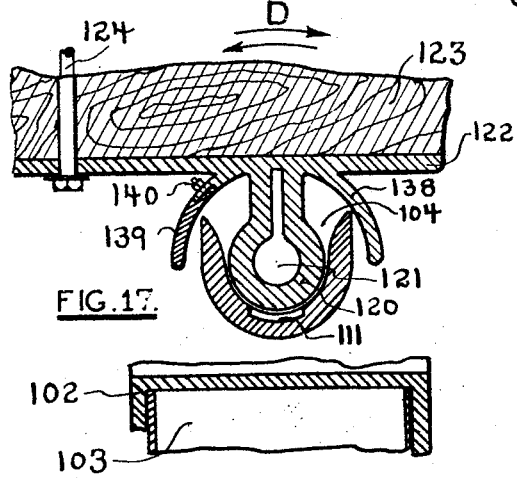
Inventor
BERT G. GOBLE.
By
Tom G. Boman. Attorney

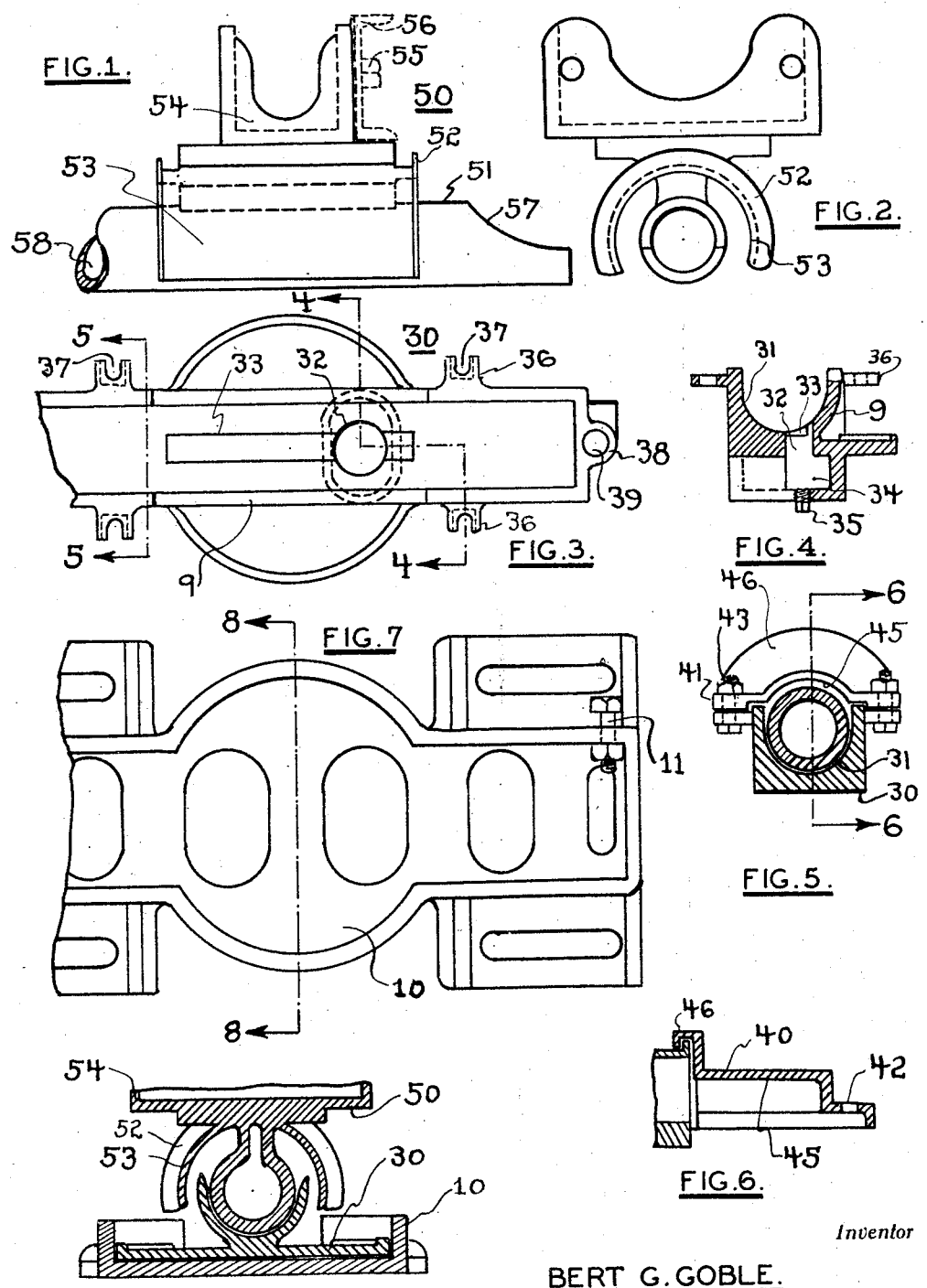

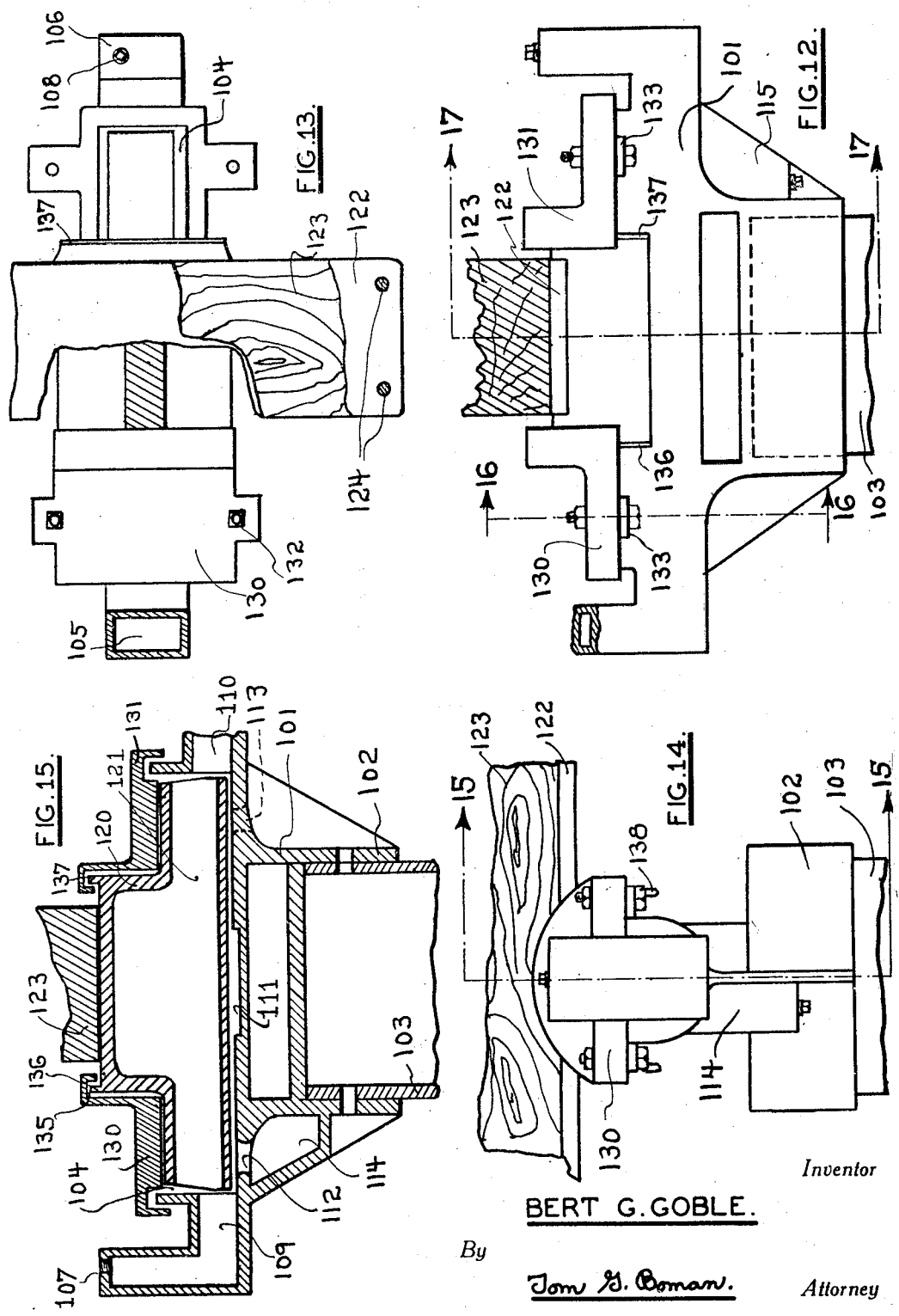

Patented Oct. 11, 1932

1,882,492

UNITED STATES PATENT OFFICE

BERT G. GOBLE, OF TULSA, OKLAHOMA, ASSIGNOR TO W. A. QUIGLEY

OIL BATH BEARING WITH A ROOF

Application filed August 7, 1929. Serial No. 384,061.

This invention relates generally to a fulcrum or pivot bearing and more particularly to an oscillating bearing which might be used for the main bearing of either a pumping jack or a walking beam.

The usual type of bearing used for the purpose of supporting oscillating beams of this character consists of a trough shaped lower member, which is made rigid by fastening it to a suitable base and an upper journal portion which is integral with the travelling member. The above arrangement is oiled by merely filling the trough shaped member with the oil. Thus, when it rains, the rain enters the trough member and displaces the oil. As the water is heavier than the oil it settles to the bottom of the recess or chamber and consequently the oil must be removed before the water can be swabbed out.

Another objection to the old style bearings having baths of oil is that any cuttings or chippings from the wearing parts work down into the lower part of the recess where they cut and grind the oscillating journal member. Most of the weight is centered at the very point where the cuttings gather and naturally this causes very detrimental effects. Also, it is at this point that water is prone to gather with the consequent exclusion of oil.

Another objection to present day bearings is the fact that they are not arranged to have any means whereby they may withstand upward movement of the journal member.

Now, in my improved bearing, I provide a means which absolutely prevents any water from entering the oil chamber and which means operates at all times. This means consists of a roof over the center portion of my bearing and end caps over the end portions. The roof and the end caps are fitted together so that no rain can get into the lubricant chamber. Thus, the chamber only needs to be filled with oil a few times a year.

Another advantage of my bearing is that I take care of the upper pressure thereon by providing a lower bearing surface on the caps which is entirely below the top of the oil in the lubricating chamber and thus I have a perfect bath of oil for the bearing.

Another object of my invention resides in my arrangement whereby the cuttings and the sediment in the oil settle away from the moving parts and thus prolong the life of the bearing.

Still another object of my improved bearing is the fact that the dirty and used oil may be drained out readily by removing the plug at the bottom of the sediment chamber. When the good oil begins to flow out of this hole the plug is reinserted. Thus a saving in oil is obtained. New oil is now added to completely fill the lubricant chamber.

Yet another object is my vacuum gravity feed oil tank which so operates as to allow the oil level in the vacuum reservoir to remain above the operating level of the bearing and yet prevent the oil from escaping over the sides of the bearing recess.

Other objects and advantages reside in the special construction, combination and arrangement of the various elements forming the invention as more fully hereinafter described and claimed, reference being had to the accompanying drawings forming part hereof, wherein;

Fig. 1 is a side view of the journal or top member.

Fig. 2 is an end view of the top member.

Fig. 3 is a top or plan view of the lower bearing member.

Fig. 4 is a view taken along the line 4—4 of Fig. 3.

Fig. 5 is a view taken along the line 5—5 of Fig. 3.

Fig. 6 is a view taken along the line 6—6 of Fig. 5.

Fig. 7 is a plan view of the base member.

Fig. 8 is a view taken along the line 8—8 of Fig. 7, with the lower bearing member and the top journal saddle member in place thereon.

Fig. 9 is a longitudinal cross sectional view taken through a modified form of my invention.

Fig. 10 is a view taken along the line 10—10 of Fig. 9.

Fig. 11 is a view in cross section taken along the line 11—11 of Fig. 9.

Fig. 12 is a side view of a modification showing my improved bearing designed especially for mounting on top of a round post.

Fig. 13 shows a top or plan view of the same bearing, certain parts being broken away for the sake of clearness.

Fig. 14 is an end view of this modification.

Fig. 15 is a cross sectional view taken along the line 15—15 of Fig. 14.

Fig. 16 is a view taken along the line of 16—16 of Fig. 12.

Fig. 17 is a view taken along the line 17—17 of Fig. 12.

Referring particularly to Figs. 7 and 8, 10 indicates a base member, 30 indicates the lower journal member and 50 indicates the upper journal member. These three parts are interconnected and coact as set forth in my invention titled a "Well Pumping Jack", filed July 12, 1926, Serial No. 122,002. As this previously filed application sets forth the base member 10 is rigidly fastened in place and the lower journal member 30 is susceptible of limited circular movement therein. The journal member 50 oscillates in the lower bearing member 30.

Also as shown in Fig. 7, 11 indicates an adjusting means which is set forth in my application entitled an "Underpull Jack", filed October 1, 1928, Serial No. 409,077.

In the present invention the base member 10 is so shaped as to provide a seat for the lower bearing member 30. The relationship between these two mentioned members forms no part of the present invention and hence will not be described in detail. The lower bearing member 30 is cast integrally and has a hollowed out portion 31 extending entirely therealong as clearly shown in Fig. 5. A hole 32 is formed in the bottom of this curved or hollowed out portion and a groove 33 is formed in the bottom of this curved surface and runs into the hole. This hole connects with a sediment chamber 34 which has a plug 35 in the bottom thereof. Thus any foreign or extraneous matter may find its way along the groove 33, through the hole 32 and into the chamber 34. The dirt and sediment may be removed from the chamber by removing the plug 35 and flushing out the chamber when desired.

The member 30, is provided with side ears 36 having slots 37 therein and end lugs 38 having holes 39 therein. End caps 40 have ears 41 at their sides and holes 42 at their outer ends. Figs. 5 and 6. Bolts 43 pass through the ears 41 and the slots 37 in the ears 36 and hold the end caps or covers in place. This end cap or cover 40 has an inner curved surface 45 which conforms to the journal member 50 and thus keeps the journal member from jumping out. Normally, there is no pressure in this direction but frequently an 'up-kick' occurs when something breaks and when such happens no harm is done and the bearing remains in operative position.

The end cap or cover 40, has an overhanging flange 46, which overlaps in semi-circular relationship the rib 52 on the roof 53. The journal member 50 is formed of the journal 51 the roof 53 and a box like portion 54. These three parts are cast integrally as shown in Figs. 1 and 2. The portion 54, is fastened by means of 55 to the walking beam or other oscillating member 56. This is shown in dotted lines in Fig. 1. As will be seen by inspecting Fig. 2, the roof 53 is cylindrically shaped and laps downwardly over the center portion of the walls, 9, of the member 30. It will be noted that these walls 9, see Fig. 4, are curved inwardly whereby the roof 53 may rotate thereunder and hence obtain maximum movement of the upper journal about its pivot point. The journal member 51 is cut away as at 57 and hollowed out as at 58 in order to increase the quantity of oil which may be carried by the lower bearing member 30.

Referring to Figs. 9, 10 and 11, 60 indicates the hollowed out bearing member, which has depending flanges 61 and 62 thereon, this member is recessed as at 63 and the small ends 64 of the journal member 65 are revolubly received in these recesses. The enlarged center portion 66 of the journal member 65 rides in a recess portion 67 formed complementary thereto and an upstanding portion 68 on the journal member 65 provides means for rigidly retaining it with the oscillating parts.

As shown in Fig. 10 the journal 65 is provided with a cylindrical shaped roof 69 having ribs 70 at each end thereof.

End caps 80 are held in place as by bolts 81. These end caps have overhanging portions 82 which snugly fit over the ribs 70 and thus provide a rain proof joint between the journal member 65 and themselves and also have depending portions which fit against the small ends 64 of the journal and prevent them from kicking up when the caps are once bolted into place.

Referring now to Figs. 12 to 17, which shows a modification of my invention, numeral 101 designates a main casting which serves as the base of this bearing. This base 101, has a depending flange 102 by which it is attached to the supporting post 103. As clearly shown in Fig. 15 the upper part of this base member is hollowed out as shown at 104 and this hollowed out portion is connected with two end reservoirs 105 and 106, having filling apertures 107 and 108 respectively, by means of ducts or passageways 109 and 110 respectively. The hollowed out portion 104, is slightly enlarged as at 111, see Fig. 15, for the purpose of providing a place for chippings and the like from the wearing surfaces to settle. Openings 112 and 113 are also provided in the base member and lead down into the lower reservoirs 114 and 115. These lower reservoirs serve as settling basins and collect any sediment or extraneous matter which may have found its way into the oil.

Journal member 120 is hollowed out as at 121 and rides in the recess 104. This journal member has a flat plate cast integrally therewith, designated 122 and bolts 124 provide means whereby it may be attached to the oscillating beam 123.

The journal member 120 has an arcuate portion 125 around its top part and a larger arcuate portion 126 around its bottom part. The arcuate portion 126, rides in the recess 104 and the arcuate portion 125 is adapted for rubbing contact with caps 130 and 131. These caps are held firmly in place by bolts 132 passing therethrough and also through flanges 133 on the base member. Each of these caps are hollowed out as shown at 135 and circumferential ribs 136 and 137, see Fig. 15, nest in these grooves. The ribs 136 and 137 are cast integrally with a curved portion 138 which extends in sheltering relationship over the central part of the open recess 104 of the base member. An auxiliary member 139 is bolted to the member 138 as at 140 and completes the roof. Thus when the beam 123 and the journal member 120 oscillate in the direction shown by the arrows D, see Fig. 17, the sheltering roof 138 coacting with the caps 130 and 131 furnishes a complete shelter for the enclosed journal.

When it is desired to use the bearing shown in Figs. 12 to 17 inclusive, apertures 107 and 108 are opened and filled entirely full with lubricant. These openings or apertures are quickly closed before the oil can run out and thus the lubricant or oil is held in place by the vacuum above it. Thus the oil remains at all times above the top of the journal portion 125 and thus all of the engaged parts operate in a bath of oil.

From the above description it will be seen that I have invented a bearing which is particularly adaptable to outdoor use since it will carry its own bath of oil for a long period of time without allowing any moisture to enter and dilute the same. Furthermore, I have invented a bearing which has all of its contacting parts operating under a bath of oil with the inherent satisfactory results.

What I claim is:

1. A bearing consisting of a hollowed out bearing member, means for holding the bearing member in place, a journal member revolubly mounted in the hollowed out bearing member and means, having a downwardly extending portion fitting over and contacting with the journal member, fastened to the bearing member whereby said means contacts with said journal member below the top of the hollowed out bearing member.

2. In a bearing having a hollowed out receiving bearing member and a journal rotatively mounted therein the combination of a roof portion fastened to the journal member and curved in conformity with a circumference drawn about the axis of oscillation or revolution and end caps fastened to the base member and extending in overlapping relationship with the roof part on the journal.

3. A bearing consisting of a base member having a hollowed out portion, said hollowed out portion being enlarged in its center; a journal member fitting in said hollowed out portion and also being enlarged in its center in complementary relationship to the base member, said journal being adapted to oscillate in said base member, and an upstanding portion fastened to the journal, cylindrical curved roof means also fastened to the journal and extending part way therearound the axis of oscillation and in spaced relationship to the base member whereby it will not contact with the base member; and cover means fastened to the base member, said cover means having an overhanging part relative to the cylindrical curved means on the journal member whereby a rain-proof juncture is formed therebetween.

4. A device as set forth in claim 3 but further characterized by the fact that the cover means have depending portions curved in conformity to and contacting with the smaller end portions of the journal member.

5. A bearing consisting of a base member having an open recess therein and a closed recess formed therein, a passageway in said base leading from the bottom of the open recess into the closed recess, a journal member having its journal portions mounted entirely in and below the top of the open recess and means rigidly fastened to the base member and extending downwardly into the open recess to hold the journal in place.

6. A saddle casting having a roof portion formed rigid therewith, a trough shaped bearing for supporting the casting and caps on the bearing extending over the roof portion.

7. A trough shaped base bearing suitable to receive a horizontal oscillating journal comprised of a hollowed out base member, a journal member mounted therein, end caps on the base member, said end caps having an integral rib thereon, and means on the journal coacting with the rib.

8. In a device of the character described, a one-piece supporting member providing a horizontal trough closed at the ends, means to maintain the supporting member in horizontal position, a saddle member having depending and opposed journals resting in opposite ends of the trough, roof means fitting over said journals and the ends of the trough whereby entry of rain and the like down into the trough is prevented, and roof means rigid with and extending downwardly from opposite sides of the saddle member in longitudinal relationship to the trough whereby the center portion of the trough is shielded from rain and the like.

In testimony whereof I affix my signature.

BERT G. GOBLE.